United States Patent [19]

Matsushita et al.

[11] Patent Number: 5,082,437

[45] Date of Patent: Jan. 21, 1992

[54] REACTION INJECTION MACHINE UTILIZING A PLURALITY OF REACTANT LIQUIDS

[75] Inventors: Hiroomi Matsushita, Kobe; Masao Maekawa, Ibaragi; Masaji Hasegawa; Tetsuo Yamaguchi, both of Nishinomiya; Kunio Niwa, Kobe, all of Japan

[73] Assignee: Sumitomo Rubber Industries, Ltd., Hyogo, Japan

[21] Appl. No.: 507,505

[22] Filed: Apr. 11, 1990

[30] Foreign Application Priority Data

Apr. 13, 1989 [JP] Japan .............................. 1-94939
Sep. 4, 1989 [JP] Japan .............................. 1-228643

[51] Int. Cl.⁵ .......................................... B29C 45/24
[52] U.S. Cl. ...................................... 425/225; 264/39; 264/328.6; 425/543
[58] Field of Search ................... 425/543, 544, 255; 264/240, 39, 328.6, 328.13, 328.17

[56] References Cited

U.S. PATENT DOCUMENTS

| | | | |
|---|---|---|---|
| 2,862,239 | 12/1958 | Pollard et al. | 264/39 |
| 3,008,193 | 11/1961 | Been | 264/240 |
| 3,692,442 | 9/1972 | Gerbert | 264/39 |
| 3,706,518 | 12/1972 | Bunte | 425/381 |
| 3,840,312 | 10/1974 | Paulson et al. | 264/328.13 |
| 4,473,531 | 9/1984 | Macosko et al. | 422/133 |
| 4,895,507 | 1/1990 | Yano | 264/39 |

FOREIGN PATENT DOCUMENTS

| | | | |
|---|---|---|---|
| 52-38568 | 3/1977 | Japan | 264/328.13 |
| 61-5908 | 1/1986 | Japan | 264/39 |
| 63-57207 | 3/1988 | Japan | 264/39 |
| 1156006 | 6/1989 | Japan | 264/328.13 |

Primary Examiner—Jay H. Woo
Assistant Examiner—William J. Matney, Jr.
Attorney, Agent, or Firm—Birch, Stewart, Kolasch & Birch

[57] ABSTRACT

A reaction injection machine utilizing a plurality of reactant liquids, including a plurality of supply vessels for containing the reactant liquids, an injection tank and a fixed quantity metering device including a plurality of metering tanks provided for the supply vessels, a plurality of metering pipes for connecting the supply vessels with the metering tanks, and a plurality of supply pipes for supplying to the injection tank the reactant liquids metered in the metering tanks, whereby the reactant liquids are metered in the metering tanks so as to be supplied to the injection tank through the supply pipes and then, are stirred for mixing in the injection tank so as to be injected into a mold immediately after having been mixed.

13 Claims, 11 Drawing Sheets

REACTION INJECTION MACHINE UTILIZING A PLURALITY OF REACTANT LIQUIDS

BACKGROUND OF THE INVENTION

The present invention relates to a reaction injection machine utilizing a plurality of reactant liquids, in which in view of the fact that the mixed liquids are cured rapidly, the reactant liquids are mixed immediately before their injection into a mold and the mixed liquids are required to be injected under pressure into the mold.

Figure 1:
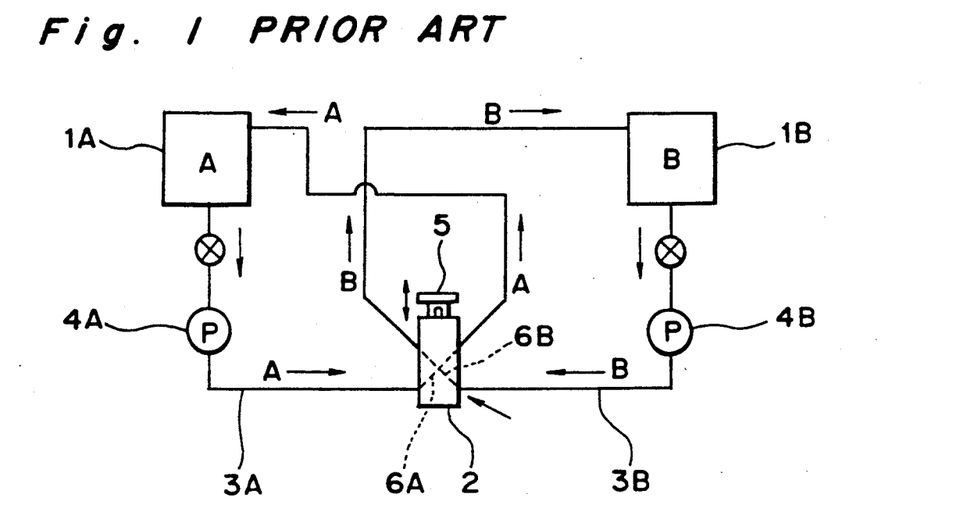
FIG. 1 is a schematic view of a prior art reaction injection machine of impingement mixing type (already referred to)
Figure 2:
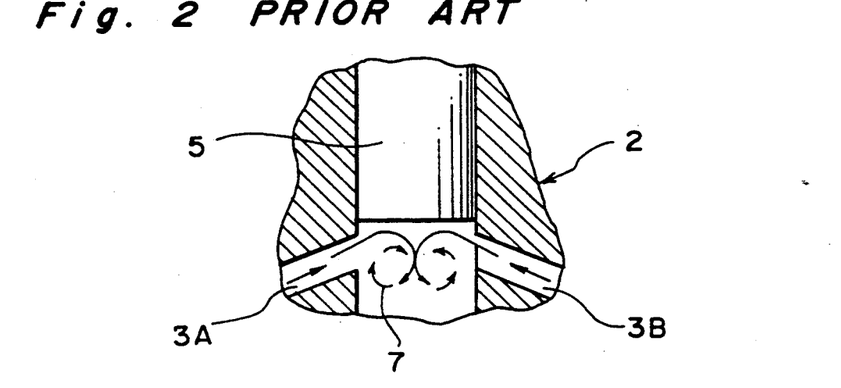
FIG. 2 is a fragmentary sectional view of the prior art machine of FIG. 1 (already referred to)

Conventionally, a reaction injection machine of this kind is known from, for example, U.S. Pat. No. 4,473,531 as shown in FIGS. 1 and 2. The known machine includes supply vessels 1A and 1B for containing reactant liquids A and B, respectively and a mixhead 2 which is connected to the supply vessels 1A and 1B by flow lines 3A and 3B, respectively. Metering pumps 4A and 4B are, respectively, provided in the course of the flow lines 3A and 3B. The liquids A and B are continuously supplied at a predetermined pressure from the supply vessels 1A and 1B to the mixhead 2 by the metering pumps 4A and 4B. A piston 5 is provided in the mixhead 2 and is formed with passages 6A and 6B. In response to downward and upward movement of the piston 5 in the mixhead 2 in the directions shown by the arrows, communication of the passages 6A and 6B of the piston 5 with the flow lines 3A and 3B is established and cut off, respectively. Namely, at the time of injection, communication of the passages 6A and 6B with the flow lines 3A and 3B is cut off as shown in FIG. 2 and the liquids A and B are shot at high pressure and at high speed into a mixing chamber 7 disposed below the piston 5 in the mixhead 2 so as to impinge against each other. Through impingement of the liquids A and B, the liquids A and B are mixed. Subsequently, the mixed liquids A and B are injected at a predetermined injection pressure into a mold (not shown).

On the other hand, at the time of completion of injection, the piston 5 is moved to its lower stroke end as shown in FIG. 1 and the passages 6A and 6B of the piston 5 are, respectively, communicated with the flow lines 3A and 3B such that the liquids A and B are, respectively, circulated by the metering pumps 4A and 4B as shown by the arrows. Clearance between the piston 5 and an inside diameter of the mixhead 2 is set at a quite minute value. Thus, during travel of the piston 5, the mixed liquids A and B adhering to the wall of the mixing chamber 7 is mechanically scraped therefrom through sliding contact of the piston 5 with the wall of the mixing chamber 7.

However, the above described known machine of the impingement mixing type has such a drawback that the liquids A and B adhering to the wall of the mixing chamber 7 are not sufficiently scraped therefrom during the travel of the piston 5 and therefore, the remains on the wall of the mixing chamber 7 to some extent. Therefore, the mixed liquids A and B remaining on the wall of the mixing chamber 7 are required to be washed off periodically and may adversely affect molded items.

Furthermore, in order to prevent improper mixing of the liquids A and B in the known machine, since the liquids A and B are required to be injected into the mixing chamber 7 at high pressure and at high speed so as to impinge against each other, a high pressure of about 170 to 220 kg/cm$^2$ should be applied to the machine. Hence, the known machine of the impingement mixing type has the inconvenience that an apparatus for generating high pressure is required to be provided and that even if the liquids A and B are injected into the mixing chamber 7 at high pressure and at high speed, the mixing degree of the liquids A and B is unstable as compared with a case in which the liquids A and B are stirred and mixed by a stirrer.

Figure 3:
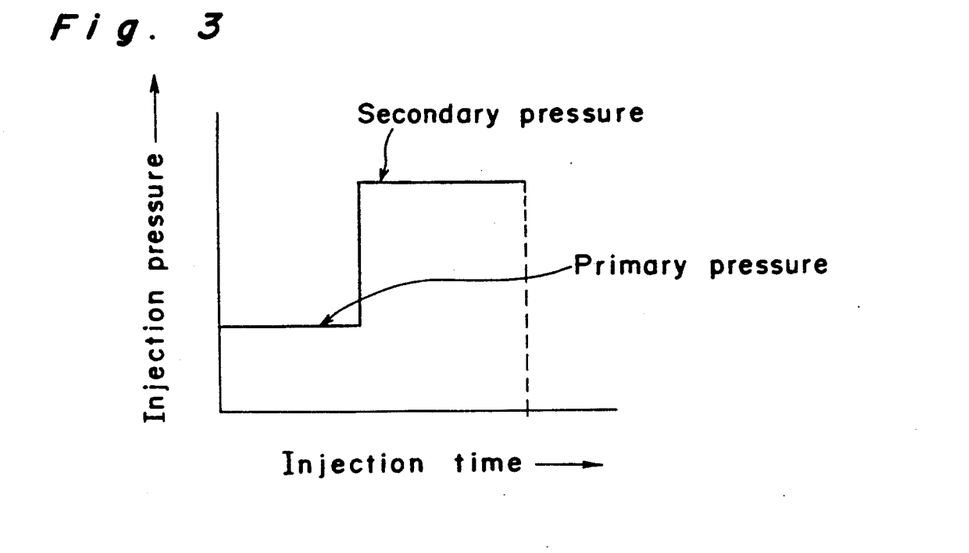
FIG. 3 is a graph showing relation between injection time and injection pressure in injection molding of the present invention (already referred to)

Meanwhile, at the time of injection molding, it is desirable for achieving quality of molded items as shown in FIG. 3 that after the mixed liquids A and B have been injected at an injection pressure (primary pressure), a holding pressure (secondary pressure) higher than the primary pressure is applied to the injected mixed liquids A and B. However, in the above mentioned known machine of the impingement mixing type, since it is difficult to perform such two-stage pressure control of the primary and secondary pressures, it is next to impossible on the following ground to apply a secondary pressure larger than the primary pressure. Namely, since the flow lines 3A and 3B open into the mixing chamber 7, the mixed liquids A and B will flow back to the flow lines 3A and 3B from the mixing chamber 7 if a high secondary pressure is applied.

SUMMARY OF THE INVENTION

Accordingly, an essential object of the present invention is to provide a reaction injection machine utilizing a plurality of reactant liquids, in which not only control of a primary pressure and a secondary pressure can be performed at the time of injection but mixing of the reactant liquids and washing of an injection passage can be performed easily and positively.

Another important object of the present invention is to provide a reaction injection machine of the above described type in which the reactant liquids can be accurately metered and mixed.

In order to accomplish these objects of the present invention, a reaction injection machine utilizing a plurality of reactant liquids, according to the present invention is provided which comprises: a plurality of supply vessels for containing the reactant liquids, respectively; a reservoir for containing washing liquid; a plurality of supply pipes which have outlet ports, respectively and are, respectively, connected to said supply vessels and said reservoir such that said outlet ports are disposed adjacent to each other; a stirrer which is provided adjacent to said outlet ports; a pressure cover which is provided at a location distant from said outlet ports; a pressure pipe which is communicated with a source of pressurized gas; an injection pipe which communicates with a mold; said pressure pipe and said injection pipe being mounted on said pressure cover so as to extend through said pressure cover; a carriage which has an upper plate and is reciprocatingly provided below said outlet ports of said supply pipes and said pressure cover so as to be reciprocated horizontally; said upper plate being movably provided so as to be displaced vertically; an injection tank; a washing tank; said injection tank and said washing tank being mounted on said upper plate so as to be arranged in a direction of reciprocation of said carriage; and a waste liquid tank; said injection tank and said washing tank being adapted to be displaced, through travel of said carriage and ascent and descent of said upper plate, to a first position at which the reactant liquids are supplied to said injection tank from said supply vessels and are mixed by said stirrer, a second position at which not only interior of said injection tank is pressurized by hermetically sealing said injection tank with said pressure cover so as to inject to said mold the mixed reactant liquids in said injection tank but the washing liquid is supplied into said washing tank through one of said supply pipes from said reservoir and a third position at which interior of said washing tank is pressurized by hermetically sealing said washing tank with said pressure cover so as to deliver the washing liquid in said washing tank to said waste liquid tank through said injection pipe such that said injection pipe is washed.

In the machine of the present invention, the injection tank and the washing tank are mounted on the carriage so as to be displaced not only horizontally but vertically to the first, second and third positions sequentially. Therefore, in accordance with the present invention, a series of the necessary processes such as supply of a metered quantity of the reactant liquids, mixing of the reactant liquids, injection of the mixed liquids into the mold at the primary pressure, application of the secondary pressure to the injected mixed liquids after injection, washing of the injection passage by the washing liquid after the injection process, washing of the impeller of the stirrer, etc. can be performed fully automatically.

Especially, in the injection process, since the secondary pressure higher than the injection pressure (primary pressure) can be applied to the injected mixed liquids after injection of the mixed liquids, accuracy and quality of the molded items can be improved remarkably.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 4:
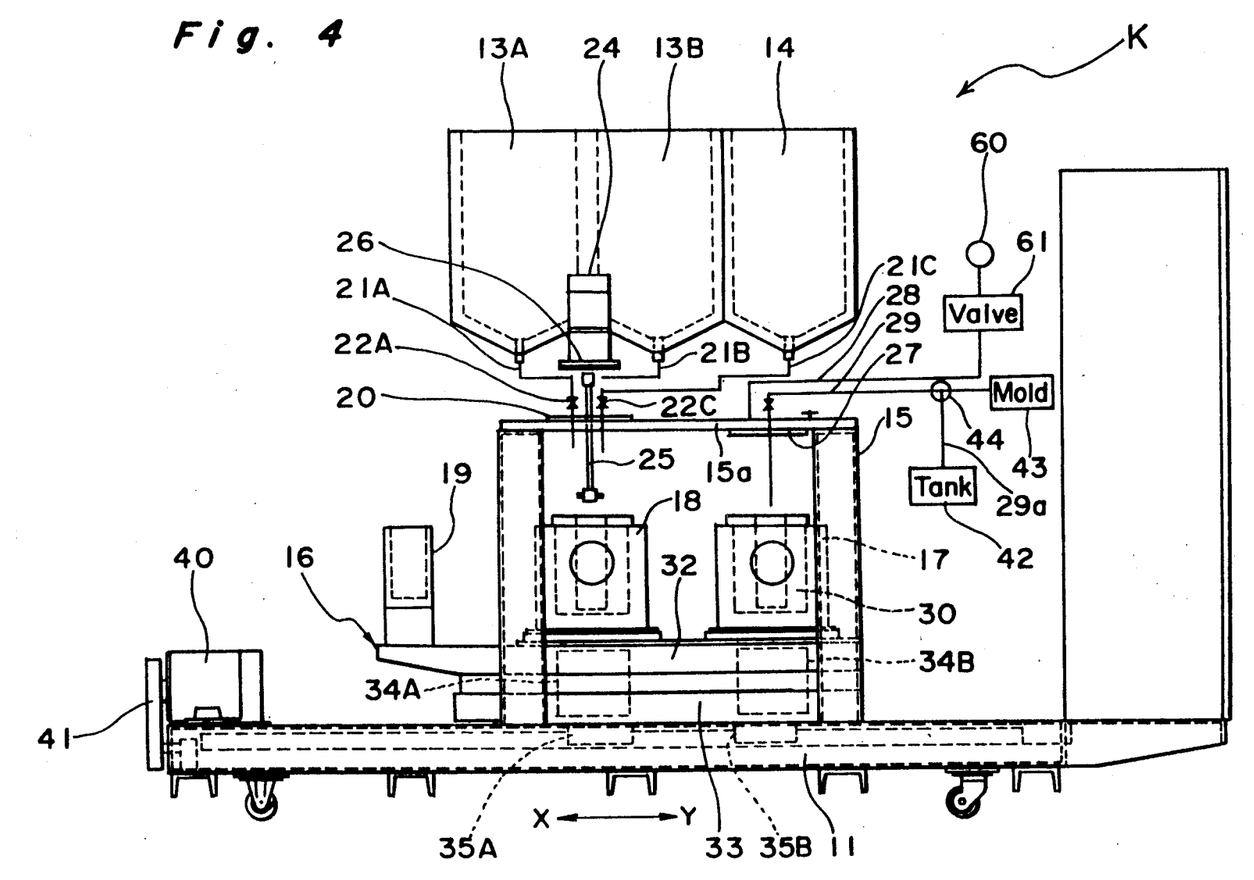
FIG. 4 is a front elevational view of a reaction injection machine utilizing a plurality of reactant liquids, according to a first embodiment of the present invention.
Figure 5:
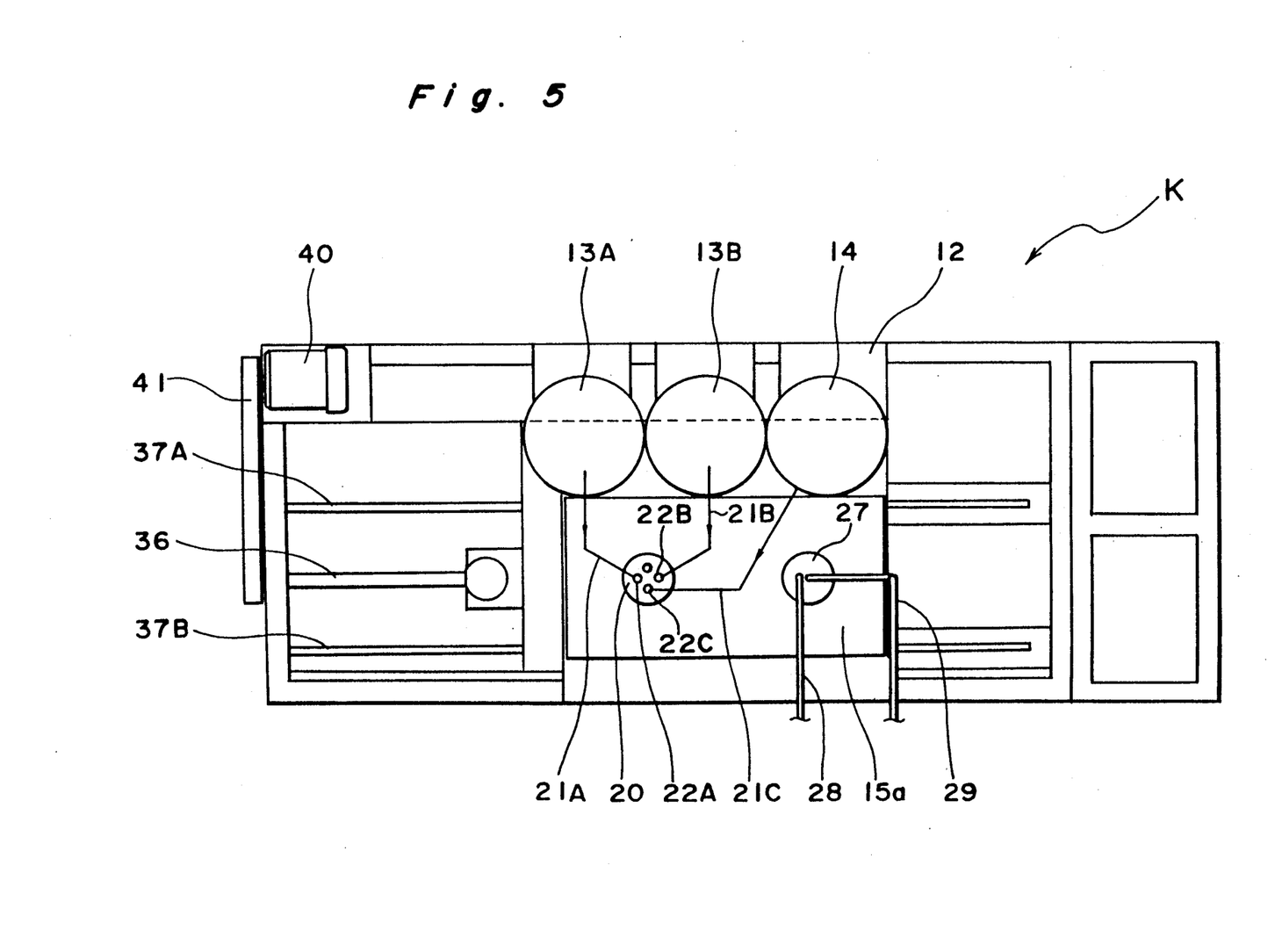
FIG. 5 is a top plan view of the machine of FIG. 4.
Figure 6:
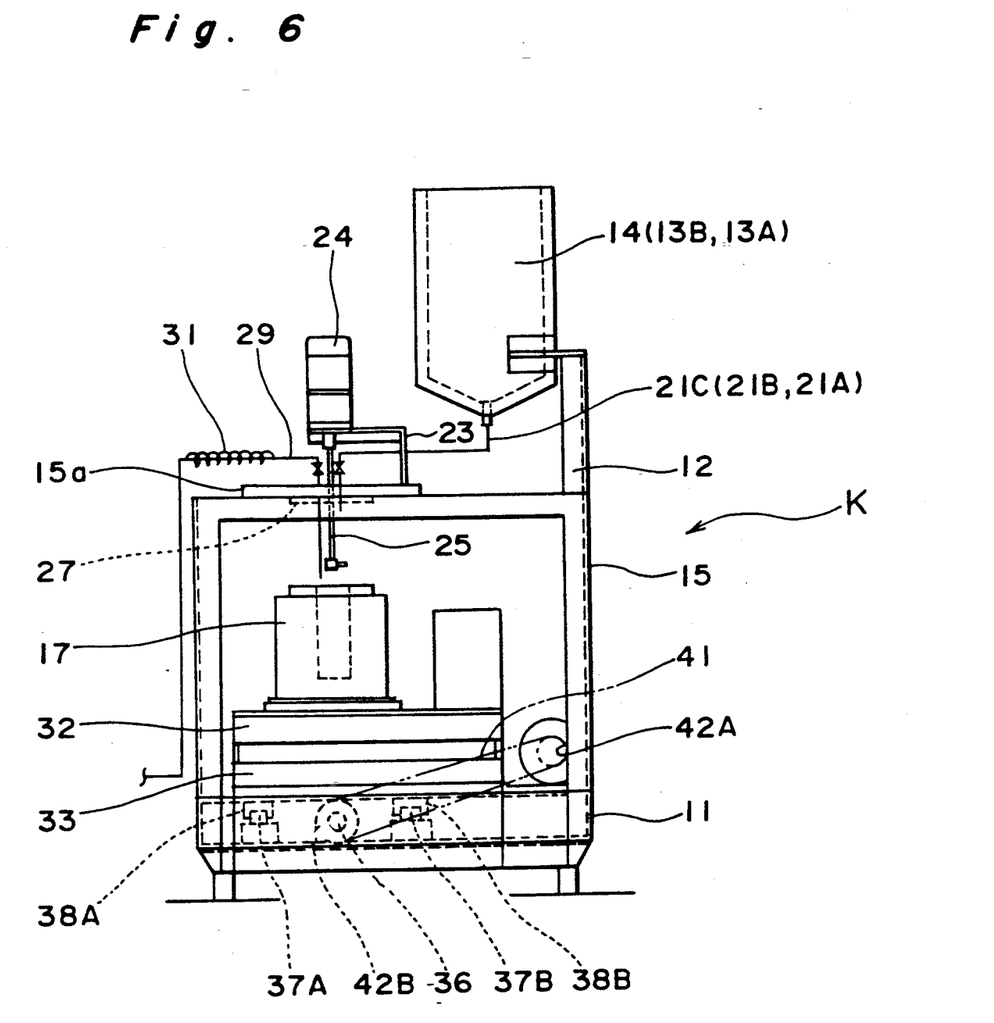
FIG. 6 is a right side elevational view of the machine of FIG. 4.

Hereinbelow, there are shown in FIGS. 4 to 6, a two-part liquid type reaction injection machine K according to a first embodiment of the present invention. The machine K includes a base 11 and a support frame 12 standing on the base 11. Supply vessels 13A and 13B for containing reactant liquids A and B, respectively and a reservoir 14 for containing washing liquid C are supported by the support frame 12 so as to be arranged as shown.

Below the supply vessels 13A and 13B and the reservoir 14, a stand 15 is mounted on the base 11 and a carriage 16 is movably provided on the stand 15 so as to be reciprocated in the directions of the arrows X and Y in FIG. 4 such that the carriage 16 passes through the stand 15. The carriage 16 has an upper plate 32 and a lower plate 33. An injection tank 17, a washing tank 18 and an impeller washing tank 19 for washing an impeller are arranged on the upper plate 32 of the carriage 16 in this order in the direction of the arrow X. Each of these tanks 17, 18 and 19 is an insulating container enabling adjustments of temperature and is detachably mounted on the upper plate 32. A mold 43 is connected to an injection pipe 29 as described later.

The stand 15 has an upper plate 15a on which a circular plate 20 is mounted. The plate 20 is provided at a left side portion of the upper plate 15a in FIG. 5. Supply pipes 21A, 21B and 21C are, respectively, connected to outlets of the supply vessels 13A and 13B and the reservoir 14, which are disposed at lower ends of the supply vessels 13A and 13B and the reservoir 14. Outlet portions of the supply pipes 21A, 21B and 21C are supported by the plate 20. Solenoid valves 22A, 22B and 22C for opening or closing the supply pipes 21A, 21B and 21C, respectively are provided in the supply pipes 21A, 21B and 21C. By controlling periods of opening of the solenoid valves 22A, 22B and 22C, metered quantities of the liquids A and B and the washing liquid C are supplied. Meanwhile, an impeller stirrer 24 having an impeller mounted on a shaft 25 is provided on the upper plate 15a of the stand 15 through a bracket 23 and the shaft 25 of the stirrer 24 extends downwardly from the stirrer 24 so as to be supported by the plate 20.

Furthermore, at a right side portion of the upper plate 15a, a pressure cover 27 is mounted on a lower face of the upper plate 15a so as to project downwardly from the lower face of the upper plate 15a. A pressure pipe 28 for introducing pressurized air is drawn from a source 60 of pressurized air and is mounted on the pressure cover 27 so as to extend through the pressure cover 27. Pressure of pressurized air supplied through the pressure pipe 28 from the source 60 of pressurized air may be adjusted by providing, for example, a solenoid valve 61 in the pressure pipe 28. Meanwhile, the injection pipe 29 which communicates with the mold 43 is mounted on the pressure cover 27 so as to extend through the pressure cover 27. An inner container 30 is detachably fitted into the injection tank 17. The other end of the injection pipe 29 extends downwardly through the pressure cover 27 and is provided at such a location as to be inserted into the inner container 30 of the injection tank 17 or the washing tank 18 in response to travel of the carriage 16. Since viscosity of the mixed liquids A and B to be injected rises rapidly through cooling, a heater 31 is wound around the injection pipe 29 so as to heat the injection pipe 29 such that rise of viscosity of the mixed liquids A and B through cooling in the injection pipe 29 is prevented.

Hydraulic cylinders 34A and 34B for lifting the upper plate 32 are provided between the upper plate 32 and the lower plate 33 of the carriage 16. By driving the hydraulic cylinders 34A and 34B, the upper plate 32 is lifted as necessary such that not only lower outlet ports of the supply pipes 21A, 21B and 21C are inserted into the inner container 30 of the injection tank 17 and the washing tanks 18 and 19 but an upper opening of the inner container 30 or the washing tank 18 is hermetically sealed by the pressure cover 27.

A drive mechanism for driving the carriage 16 includes a pair of screw blocks 35A and 35B formed with internal threads and a screw shaft 36 formed with external threads such that the screw shaft 36 is brought into threaded engagement with the screw blocks 35A and 35B. The screw blocks 35A and 35B are mounted on a lower face of the lower plate 33, while the screw shaft 36 is rotatably supported on the base 11. Upon forward and reverse rotations of the screw shaft 36, the carriage 16 is reciprocated leftwards and rightwards in FIG. 4 through the screw blocks 35A and 35B. In order to guide the carriage 16 during travel of the carriage 16, a pair of linear guides 37A and 37B are mounted on the base 11 and a pair of guide members 38A and 38B are mounted on the lower face of the lower plate 33 so as to be slidably fitted on the linear guides 37A and 37B, respectively. A reversible motor 40 for rotating the screw shaft 36 is mounted on one end portion of the base 11. Sprockets 42A and 42B are, respectively, mounted on an output shaft of the motor 40 and the screw shaft 36 and a timing belt 41 is trained over the sprockets 42A and 42B such that the screw shaft 36 is rotated by rotational drive of the motor 40.

Meanwhile, although not specifically shown in FIGS. 4 to 6, an automatic change mechanism for changing the inner container 30 automatically is employed in which the inner container 30 containing the injected mixed liquids A and B is taken out of the injection tank 17 and a new inner container 30 is inserted into the injection tank 17. In the automatic change mechanism, the inner container 30 containing the injected mixed liquids A and B is lifted by a cylinder provided below the injection tank 17 and the lifted inner container 30 is gripped by a robot so as to be taken out of the injection tank 17. Then, a new inner container 30 is inserted into the injection tank 17 by the robot, whereby change of the inner container 30 is automated.

Figure 7A:
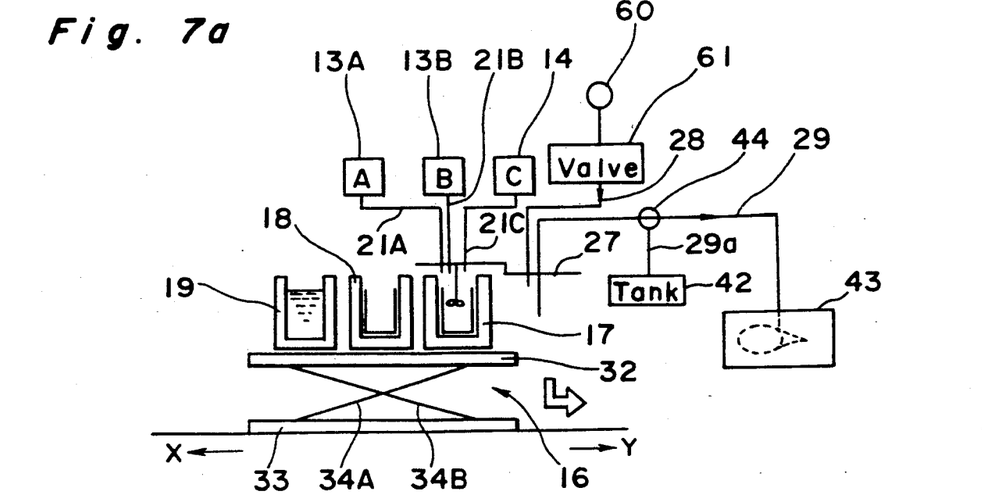
FIGS. 7a to 7d are schematic views showing operational states of the machine of FIG. 3, respectively.

Meanwhile, in this embodiment, the mold 43 connected to the injection pipe 29 is used for molding a racket frame made of resins as schematically shown in FIG. 7a. The racket frame is molded by two or more kinds of synthetic resins. As shown in FIG. 7d, the pipe 29 has a branch pipe 29a and a valve 44 for effecting selection of a flow passage is provided at the branch portion of the pipe 29. The branch pipe 29a is connected to a waste liquid tank 42.

Hereinbelow, injection and washing in the machine K are described with reference to FIGS. 7a to 7d. Initially, the washing tanks 19 and 18 and the injection tank 17 having the inner container 30 disposed therein are secured to the carriage 16 and are controlled to a temperature of 90° C. At the same time, the supply vessels 13A and 13B and the reservoir 14 are also controlled to a temperature of 90° C. At the time of starting the operation of the machine K, the carriage 16 is moved in the direction of the arrow X and is stopped at a first position shown in FIG. 7a. At the first position, the injection tank 17 disposed at the right end of the upper plate 32 is disposed immediately below the plate 20. When the upper plate 32 is lifted in this state by driving the hydraulic cylinders 34A and 34B, the outlet ports of the supply pipes 21A, 21B and 21C are disposed above the upper opening of the inner container 30 of the injection tank 17 and the shaft 25 of the stirrer 24, which has the impeller mounted thereon, is inserted into the inner container 30. In this state, the liquids A and B are, respectively, supplied into the inner container 30 of the injection tank 17 from the supply vessels 13A and 13B. At this time, by adjusting periods of opening of the solenoid valves 22A and 22B of the supply pipes 21A and 21B, the liquids A and B are metered accurately so as to be supplied into the inner container 30. Simultaneously with supply of the liquids A and B into the inner container 30, the stirrer 24 is driven so as to mix the liquids A and B in the inner container 30 for a predetermined period by the impeller of the shaft 25.

Figure 7B:
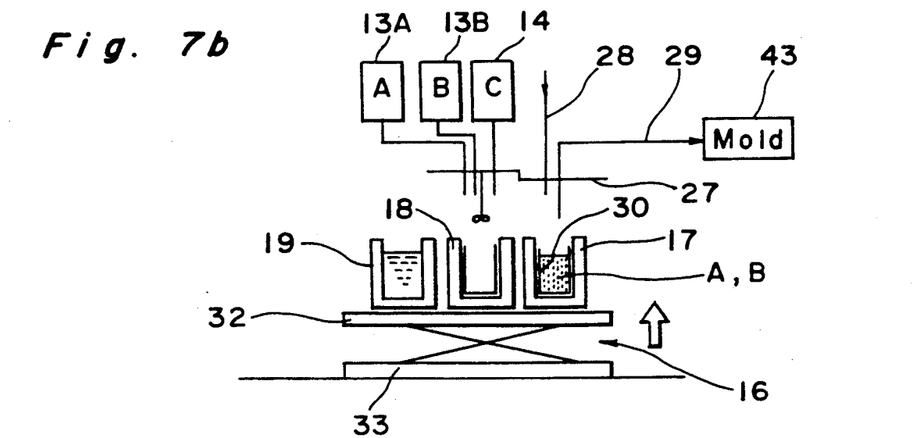
Figure 7C:
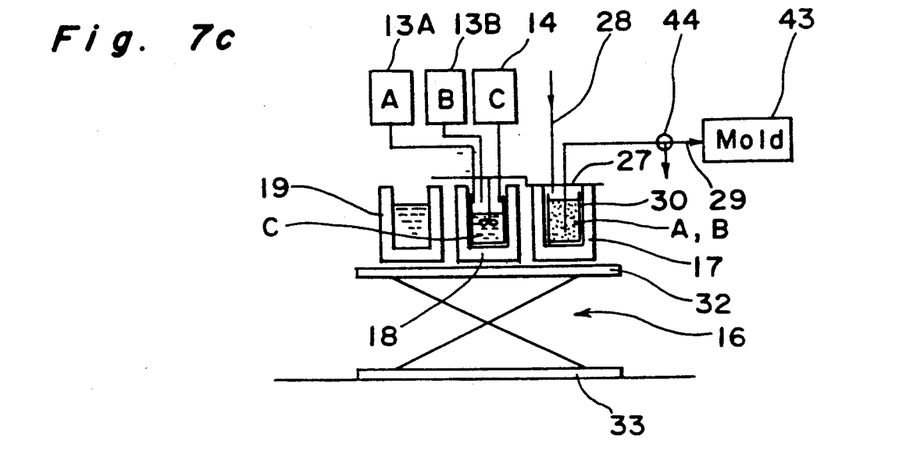
Figure 7D:
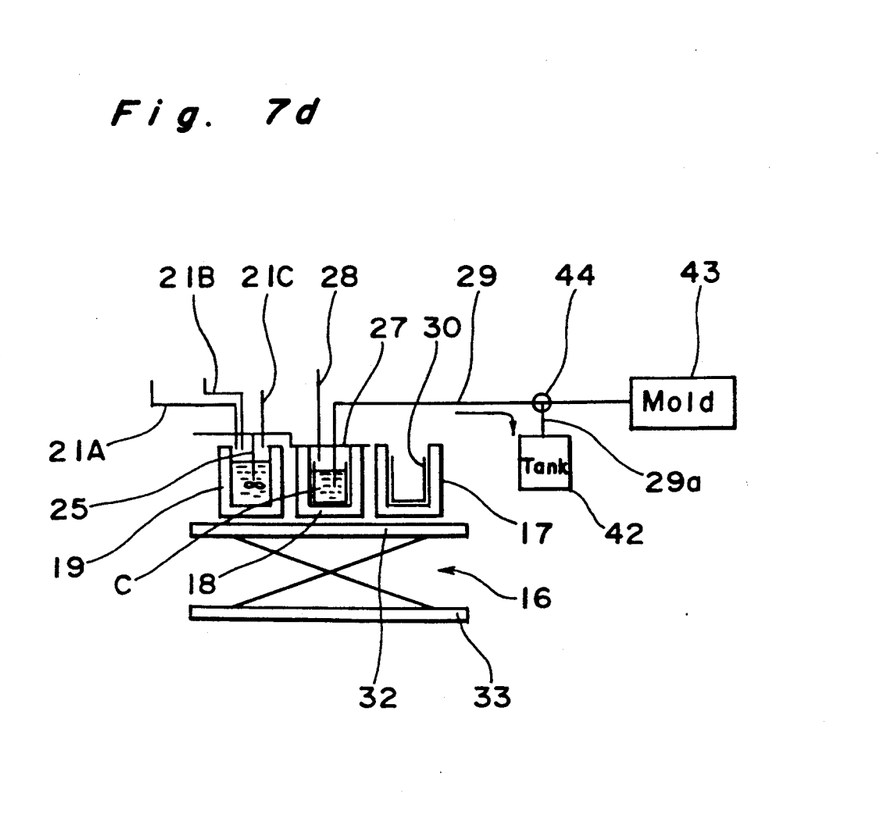

After the liquids A and B have been mixed by the impeller of the shaft 25 as described above, the upper plate 32 is lowered and the carriage 16 is moved in the direction of the arrow Y so as to be stopped at a second position as shown in FIG. 7b. At the second position, the injection tank 17 is disposed below the pressure cover 27 and the washing tank 18 is disposed below the plate 20. Subsequently, the upper plate 32 of the carriage 16 is lifted as shown in FIG. 7c. Then, the upper openings of the injection tank 17 and the inner container 30 are depressed against the pressure cover 27 so as to be hermetically sealed by the pressure cover 27. The pressure cover 27 projects downwardly from the lower face of the upper plate 15a as described earlier. Thus, at this time, a clearance is defined between the washing tank 18 and the upper plate 15a. In this state, the supply pipes 21A, 21B and 21C and the shaft 25 of the stirrer 24 are inserted into the washing tank 18.

Then, pressurized air is supplied, through the pressure pipe 28, into the inner container 30 sealed by the pressure cover 27 so as to pressurize interior of the injection tank 17. At the same time, the valve 44 provided in the course of the injection pipe 29 is actuated so as to communicate the inner container 30 with the mold 43 such that the mixed liquids A and B in the inner container 30 are injected into the mold 43 through the pipe 29 by pressurized air supplied into the inner container 30 through the pressure pipe 28.

At this time, the mixed liquids A and B are injected into the mold 43 at an injection pressure (primary pressure) which is far lower than known injection pressures. After this injection pressure has been held for a predetermined period of about 1.5 min., a holding pressure (secondary pressure) higher than the injection pressure is applied to the injected mixed liquids A and B. Concurrently with this injection, the washing liquid C is metered and supplied into the washing tank 18 by the reservoir 14. After the holding pressure has been held for a required duration, the upper plate 32 of the carriage 16 is lowered so as to disengage the injection tank 17 from the pressure cover 27 such that pressure in the injection tank 17 is released.

Subsequently, the carriage 16 is further moved in the direction of the arrow Y so as to be stopped at a third position as shown in FIG. 7d. Then, the upper plate 32 is lifted again so as to depress the washing tank 18 against the pressure cover 27 such that the washing tank 18 is hermetically sealed by the pressure cover 27. At the same time, the injection pipe 29 is inserted into the washing tank 18. On the other hand, the impeller washing tank 19 is disposed below the plate 20 and the shaft 25 of the stirrer 24 is inserted into the impeller washing tank 19. In this state, pressurized air is introduced into the washing tank 18 through the pressure pipe 28 so as to force into the injection pipe 29 the washing liquid C contained in the washing tank 18. At this time, through changeover of the valve 44 provided in the injection pipe 29, the flow passage of the injection pipe 29 is changed over to the waste liquid tank 42. Therefore, the washing liquid C carried into the injection pipe 29 washes inside of the injection pipe 29 and is drawn into the waste liquid tank 42 without proceeding to the mold 43.

Simultaneously with washing of the inside of the injection pipe 29, the impeller of the shaft 25 of the stirrer 24, which is inserted into the impeller washing tank 19, is washed by the washing liquid preliminarily supplied into the impeller washing tank 19. Meanwhile, it can also be so arranged that without preliminarily supplying the washing liquid into the impeller washing tank 19, the washing liquid is supplied from the reservoir 14 to the impeller washing tank 19 so as to wash the impeller of the stirrer 24. By washing the impeller of the stirrer 24, the mixed liquids A and B adhering to the impeller are washed off and thus, the impeller can be used again without the need for its replacement.

After the injection pipe 29 and the impeller of the stirrer 24 have been washed as described above, the upper plate 32 of the carriage 16 is lowered so as to release pressure in the washing tank 18. Thereafter, the inner container 30 in the injection tank 17 is replaced with a new one and the carriage 16 is displaced in the direction of the arrow X such that the machine K is set in a waiting state for starting automatic operation for the next mold 43.

Meanwhile, the present invention is not restricted to the above described embodiment. For example, in the present invention, pressurized air for pressurizing the mixed liquids and the washing liquid may be replaced with inert gas under pressure. Meanwhile, since the shaft 25 and the impeller of the stirrer 24, which are inserted into the mixed liquids, are made of material allowing least adhesion of the mixed liquids thereto, the impeller washing tank 19 for washing the impeller of the stirrer 24 is not necessarily required to be provided, so that only the injection tank 17 and the washing tank 18 are provided on the carriage 16.

Furthermore, pressure applied to the injection tank 17 at the time of injection and pressure applied to the washing tank 18 at the time of washing of the injection passage may be 0 kg/cm² in the case whe.. the mold has a negative pressure. Thus, these pressures may range from 0 to 10 kg/cm² according to injection conditions.

As is clear from the foregoing description, the present invention achieves the following effects (1) to (4).

(1) In the present invention, injection pressure is applied to the mixed liquids in the injection tank by detaching the supply pipes from the injection tank. Therefore, even if the high secondary pressure is applied to the mixed liquids in the injection tank after injection of the mixed liquids, such an inconvenience is not incurred that the mixed liquids are caused to reversely flow into the supply pipes by the secondary pressure. Therefore, in the present invention, since the high secondary pressure which could not be used in the known reaction injection machines of impingement mixing type can be applied to the mixed liquids, the molded items have improved quality.

(2) In order to wash the injection passage after injection of the mixed liquids, the washing liquid is spouted under pressure into the injection passage by employing the pressurizing mechanism used for injecting the mixed liquids. Therefore, the injection passage can be washed substantially completely in contrast with the mechanical washing of the injection passage in the known reaction injection machine of impingement mixing type.

(3) The liquids can be mixed rapidly and substantially completely by the impeller of the stirrer through rotational control of the stirrer.

(4) In the present invention, the reciprocating carriage is provided and the injection tank, the washing tank and the impeller washing tank are mounted on the liftable upper plate of the carriage. Upon travel of the carriage and ascent or descent of the upper plate of the carriage, a necessary one of the tanks mounted on the upper plate is carried to the supply portions for supplying the reactant liquids and the washing liquid. Furthermore, since some of these tanks requiring pressurization are pressurized by depressing the pressure cover against them, supply of a plurality of the reactant liquids to the injection tank, mixing of the reactant liquids, a series of the processes such as injection of the mixed liquids into the mold, washing of the injection passage by spouting the washing liquid into the injection passage after injection, washing of the impeller of the stirrer, etc. can be performed fully automatically. Thus, operating time of the machine can be reduced greatly, thereby resulting in remarkable improvement of its productivity.

Figure 8:
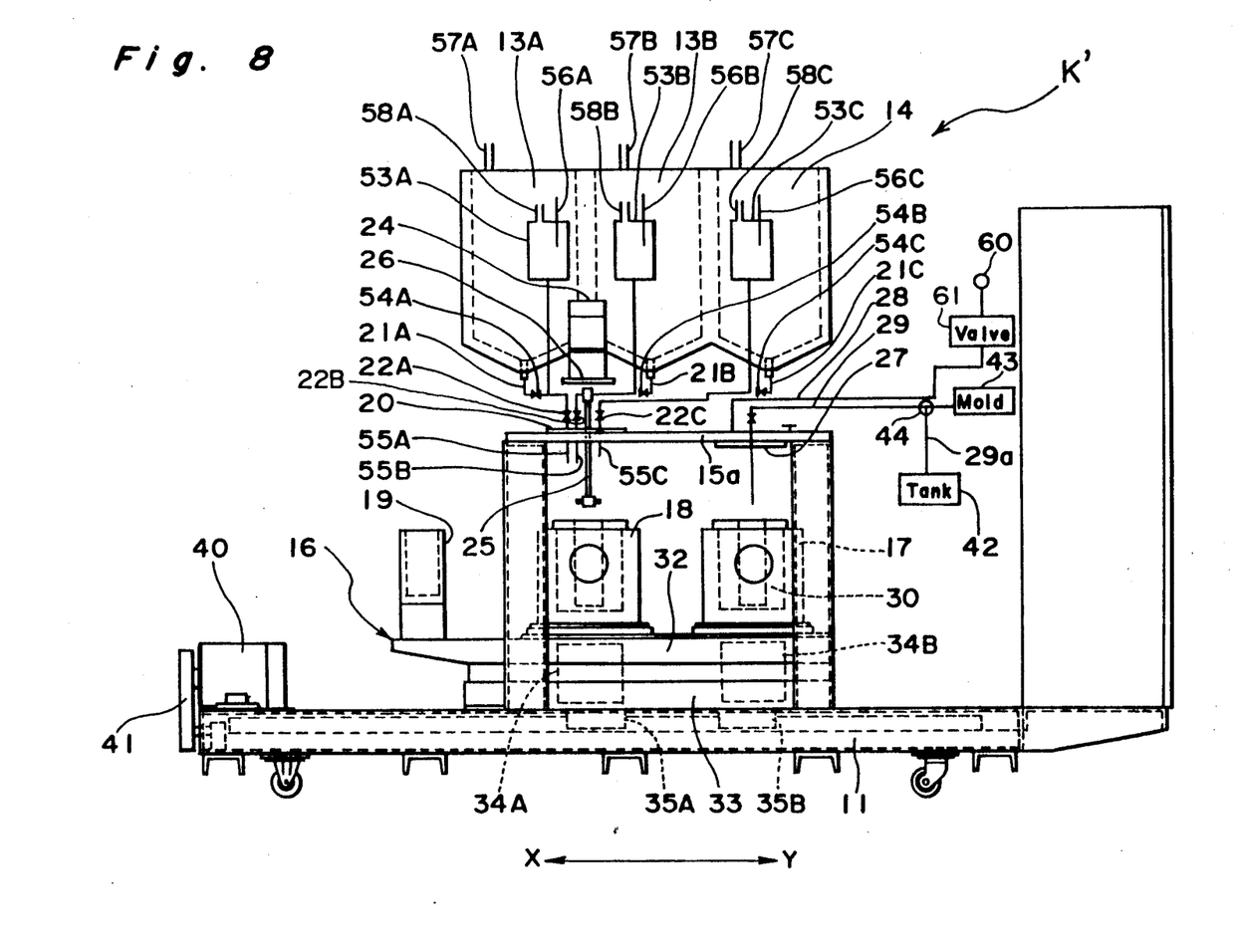
FIGS. 8, 9 and 10 are views similar to FIGS. 4, 5 and 6, respectively, particularly showing a second embodiment of the present invention.
Figure 9:
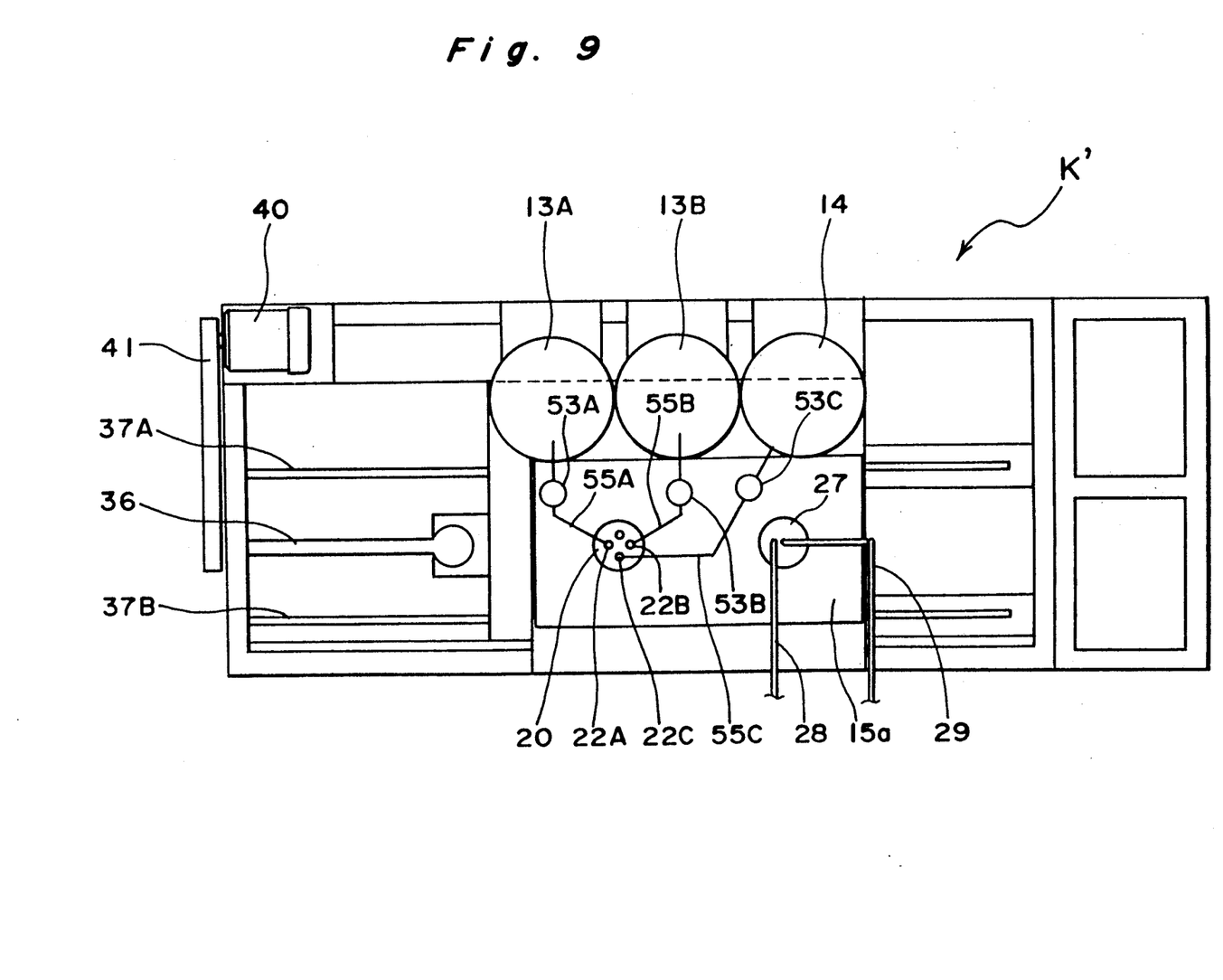
Figure 10:
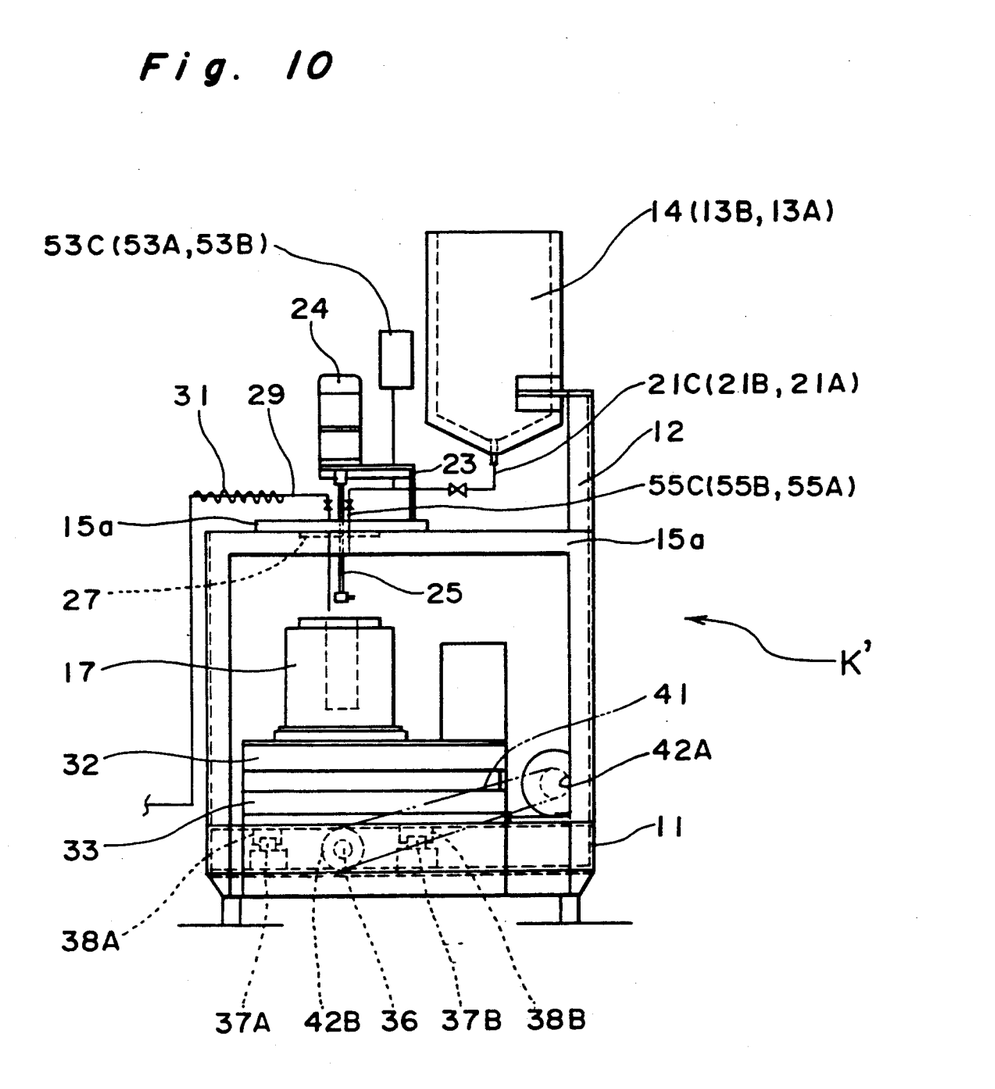

Referring to FIGS. 8 to 10, there is shown a two-part liquid type reaction injection machine K' according to a second embodiment of the present invention. Metering tanks 53A, 53B and 53C are, respectively, provided for the supply vessels 13A and 13B and the reservoir 14 so as to be supported by a support frame (not shown) erected on the base 11.

Figures 11, 12A:
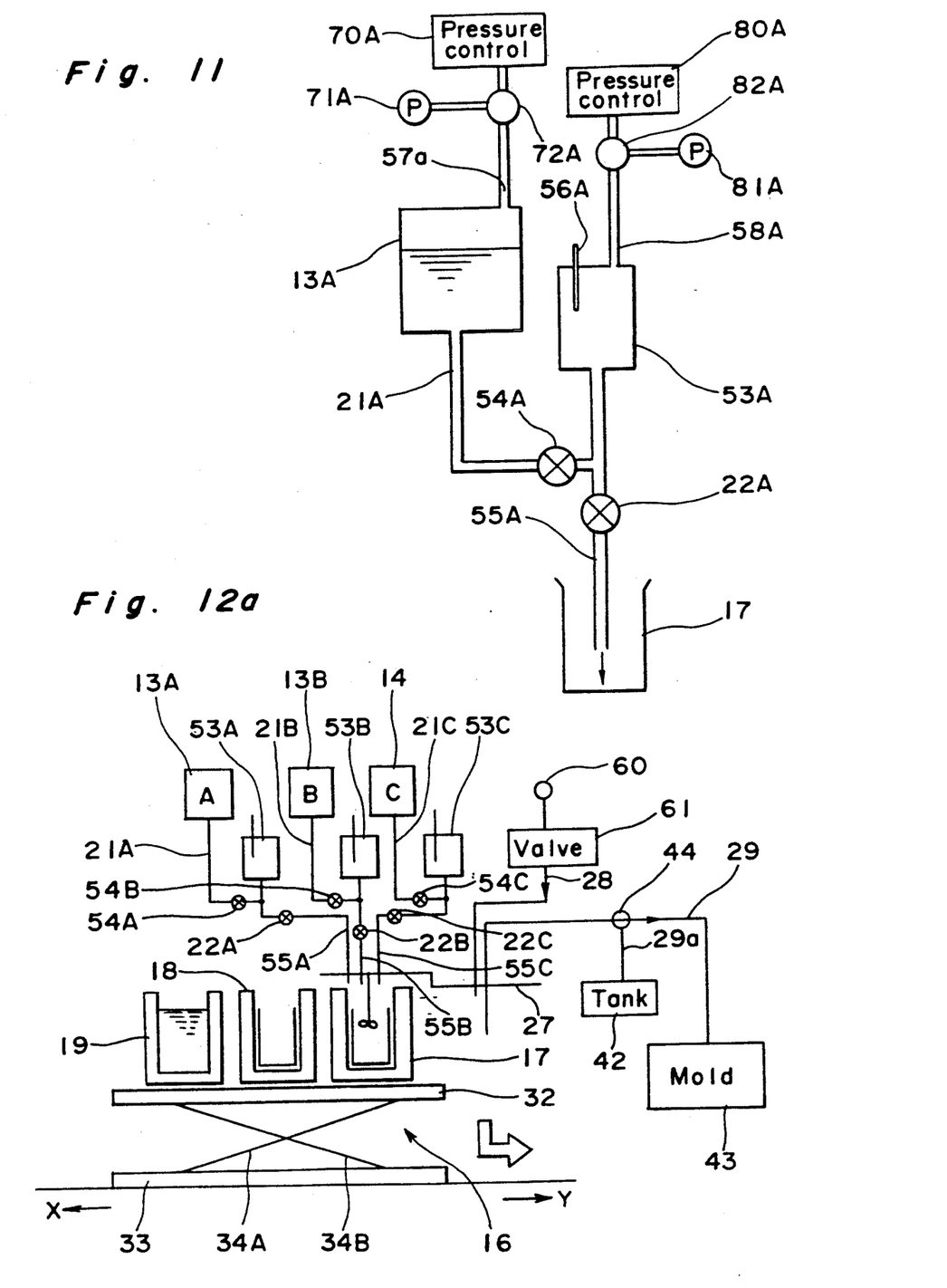
FIG. 11 is a schematic view of a supply vessel and a fixed quantity metering device employed in the machine of FIG. 8.
FIGS. 12a to 12d are schematic views showing operational states of the machine of FIG. 8, respectively.
Figure 12B:
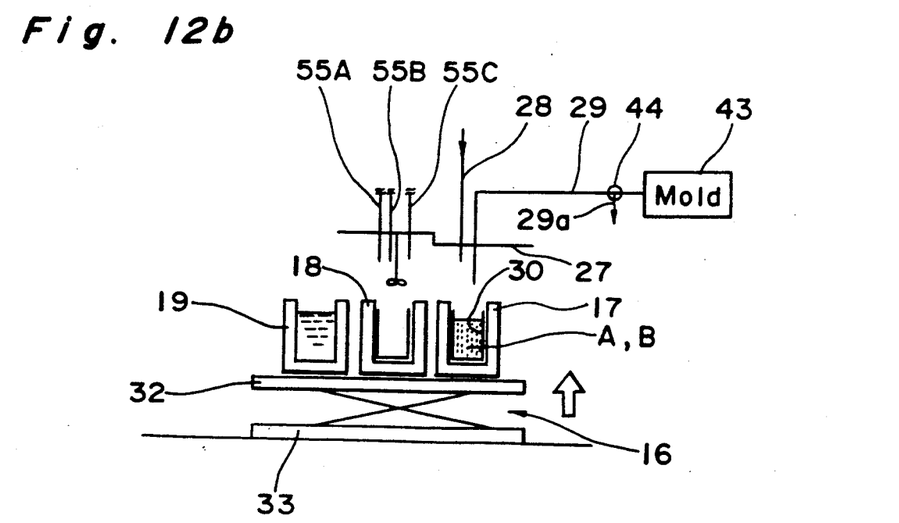
Figure 12C:
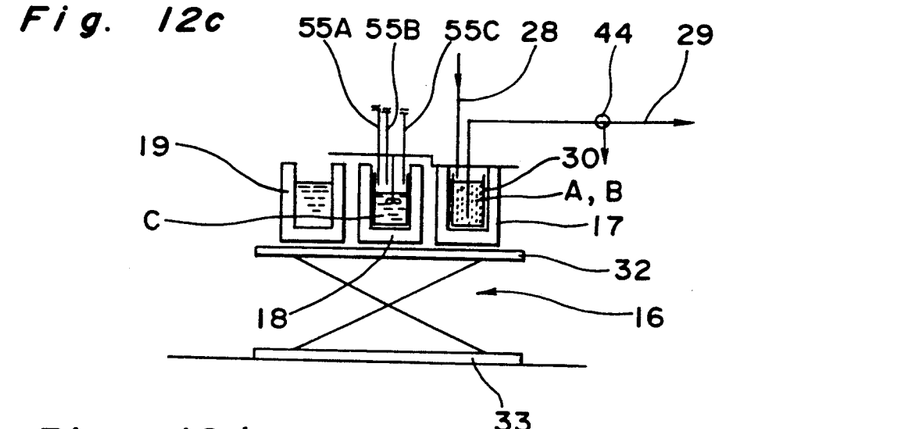
Figure 12D:
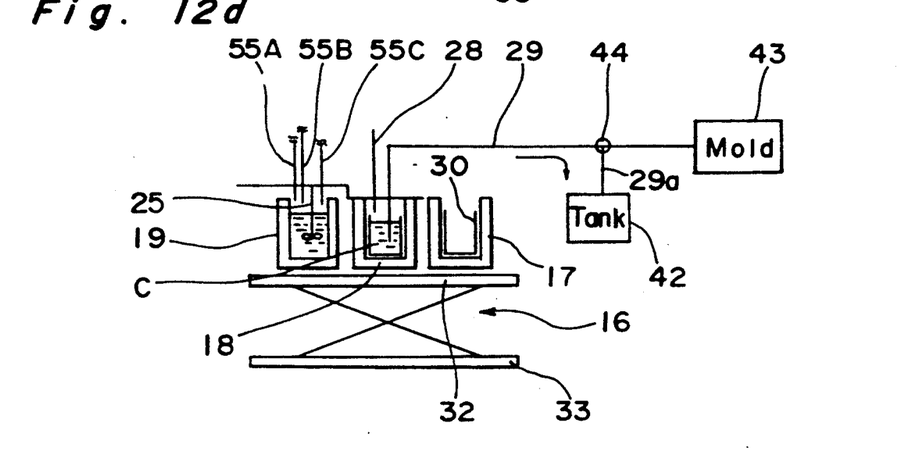

The supply vessels 13A and 13B and the reservoir 14 are, respectively, provided with fixed quantity metering devices which are constituted by the metering tanks 53A, 53B and 53C, metering pipes 21A, 21B and 21C and supply pipes 55A, 55B and 55C. Since the fixed quantity metering devices have an identical construction, only the fixed quantity metering device of the supply vessel 13A is described with reference to FIG. 11 for the sake of brevity, hereinbelow. As shown in FIG. 11, the fixed quantity metering device includes the metering tank 53A, the metering pipe 21A and the supply pipe 55A. The supply vessel 13A has an air supply port 57A. A pressure control means 70A and a vacuum pump 71A are connected, through a valve 72A, to the air supply port 57A. Interior of the supply vessel 13A are adjustably set to subatmospheric pressure, atmospheric pressure and supra-atmospheric pressure as necessary by the pressure control means 70A or can be set under vacuum by the vacuum pump 71A. The metering pipe 21A connecting the supply vessel 13A and the metering tank 53A is provided with a metering valve 54A formed by a solenoid valve.

The metering tank 53A has an air supply port 58A. A pressure control means 80A and a vacuum pump 81A are connected, via a valve 82A, to the air supply port 58A. In the same manner as the supply vessel 13A, the interior of the metering tank 53A is adjustably set to subatmospheric pressure, atmospheric pressure and supra-atmospheric pressure as necessary by the pressure control means 80A or can be set under vacuum by the vacuum pump 81A. A liquid level sensor 56A for detecting level of the reactant liquid A in the metering tank 53A is provided in the metering tank 53A such that a signal for closing the metering valve 54A is transmitted to the metering valve 54A when level of the reactant liquid A in the metering tank 53A has reached a predetermined value. The supply pipe 55A branches off from the metering pipe 21A so as to lead to the injection tank 17 and is provided with a supply valve 22A formed by a solenoid valve so as to supply the reactant liquid A in the metering tank 53A to the injection tank 17 by opening the supply valve 22A.

Since other constructions of the machine K' are the same as those of the machine K, description thereof is abbreviated for the sake of brevity.

Hereinbelow, injection and washing in the machine K' are described with reference to FIGS. 12a to 12d. Since FIGS. 12a to 12d substantially correspond to FIGS. 7a and 7d of the machine K, only operations specific to the machine K' are referred to for the sake of brevity. At the first position of FIG. 12a, predetermined quantities of the reactant liquids A and B are, respectively, supplied to the metering tanks 53A and 53B from the supply vessels 13A and 13B. Namely, the metering valves 54A and 54B are opened and the reactant liquid A in the supply vessel 13A and the reactant liquid B in the supply vessel 13B are, respectively, carried into the metering tanks 53A and 53B through the metering pipes 21A and 21B by pressure applied to the air supply ports 57A and 57B. It is to be noted that before the liquids A and B are fed to the metering tanks 53A and 53B, interiors of the supply vessels 13A and 13B are set under vacuum through the air supply ports 57A and 57B by the vacuum pumps, respectively such that gas dissolved in the liquids A and B is removed by vacuum defoaming.

When levels of the liquids A and B flowing into the metering tanks 53A and 53B have reached predetermined values, respectively, the liquid level sensors 56A and 56B detect these phenomena and transmit to the metering valves 54A and 54B signals for closing the metering valves 54A and 54B so as to close the metering valves 54A and 54B, so that feed of the reactant liquids A and B to the metering tanks 53A and 53B is completed. The liquids A and B in the metering tanks 53A and 53B are metered at a relative low pressure and at a relatively low speed and therefore, can be metered at high precision. Furthermore, by changing preset values of the liquid level sensors 56A and 56B, it becomes possible to easily change the predetermined quantities of the liquids A and B.

Subsequently, interiors of the metering tanks 53A and 53B are set under vacuum by the vacuum pumps connected to the air supply ports 58A and 58B, respectively such that gas dissolved in the liquids A and B is subjected to vacuum defoaming. Then, the supply valves 22A and 22B are opened so as to supply the liquids A and B into the inner container 30 of the injection tank 17 from the supply pipes 55A and 55B, respectively. Simultaneously with supply of the liquids A and B into the inner container 30, the stirrer 24 is driven such that the liquids A and B fed into the inner container 30 are mixed with each other by the impeller of the stirrer 24.

Gas dissolved in the liquids A and B in the supply vessels 13A and 13B has been subjected to vacuum defoaming as described above. Therefore, at the second position of FIG. 12c, the mixed liquids A and B in the inner container 30 do not contain gas and thus, voids are not formed in the molded item in the mold 43. Concurrently with injection of the mixed liquids A and B into the mold 43, a predetermined quantity of the washing liquid C is delivered, through metering of a liquid level sensor 56C, to the metering tank 53C from the reservoir 14 such that the washing liquid C is supplied to the washing tank 18 from the metering tank 53C via the supply pipe 55C.

As will be seen from the description given so far, in the second embodiment of the present invention, the fixed quantity metering devices are provided between the supply vessels and the injection tank. Therefore, the reactant liquids are initially metered by the fixed quantity metering devices and then, are supplied to the injection tank so as to be mixed in the injection tank. Accordingly, accuracy of mixing ratio of the reactant liquids can be improved.

Meanwhile, by changing positions of the liquid level sensors provided in the metering tanks, quantities of the liquids to be mixed can be accurately and easily changed and thus, quality control of the molded items can be performed easily.

Furthermore, a series of the processes such as feed of highly accurately metered quantities of the reactant liquids and the washing liquid into the injection tank and the washing tank from the supply vessels and the reservoir, injection of the mixed liquids into the mold, washing of the injection passage after injection, washing of the impeller of the stirrer, etc. can be performed fully automatically.

Moreover, since gas dissolved in the reactant liquids in the supply vessels and the metering tanks is removed by vacuum defoaming, voids are not formed in the mixed liquids injected into the mold.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A reaction injection machine utilizing a plurality of reactant liquids, comprising:
    a plurality of supply vessels for containing the reactant liquids, respectively;
    a reservoir for containing a washing liquid;
    a plurality of supply pipes having corresponding outlet ports, said supply pipes being connected to said supply vessels and said reservoir such that said outlet ports are disposed adjacent to each other;
    a stirrer provided adjacent to said outlet ports;
    a pressure cover provided at a location distant from said outlet ports;
    a pressure pipe communicating with a source of pressurized gas and an injection pipe communicating with a mold; said pressure pipe and said injection pipe being mounted on said pressure cover so as to extend through said pressure cover;
    a carriage provided with an upper plate and means for reciprocatingly moving said carriage below said outlet ports of said supply pipes and said pressure cover so as to be reciprocated horizontally;
    means associated with said upper plate for displacing said upper plate in the vertical direction;

an injection tank and a washing tank, said injection tank and said washing tank being mounted on said upper plate in spaced relationship aligned in the direction of horizontal reciprocation of said carriage, said injection tank having an interior in which a first container is disposed for receiving the reactant liquids, said washing tank having an interior in which a second container is disposed for receiving the washing liquid; and a waste liquid tank;

said injection tank and said washing tank being adapted to be displaced, through travel of said carriage and the raising and lowering of said upper plate, to a first position at which the reactant liquids are supplied to said injection tank from said supply vessels and are mixed by said stirrer; to a second position at which not only said interior of said injection tank is pressurized by hermetically sealing said injection tank with said pressure cover so as to perform an injection process of injecting into said mold the mixed reactant liquids in said injection tank but also the washing liquid is supplied into said washing tank through one of said supply pipes from said reservoir; and to a third position at which said interior of said washing tank is pressurized by hermetically sealing said washing tank with said pressure cover so as to deliver the washing liquid in said washing tank to said waste liquid tank through said injection pipe whereby said injection pipe is washed.

2. The reaction injection machine as claimed in claim 1, wherein said stirrer is an impeller stirrer having an impeller, and further comprising:

an impeller washing tank for washing said impeller of said impeller stirrer, said impeller stirrer being mounted on said upper plate co-aligned in the direction of horizontal reciprocation of said carriage relative to said injection tank and said washing tank;

wherein when said injection pipe is being washed at said third position by hermetically sealing said washing tank with said pressure cover, said impeller is inserted into said impeller washing tank to be washed.

3. The reaction injection machine as claimed in claim 1, further comprising:

a pressure control means for controlling pressure supplied through said pressure pipe to said injection tank and said washing tank, said pressure control means being provided between said pressure cover and said source of pressurized gas, on said pressure pipe so as to apply in said injection process, a secondary pressure to the :.xed reactant liquids after injection of the mixed reactant liquids into said mold at a primary pressure; said secondary pressure being equal to or higher than said primary pressure.

4. A reaction injection machine utilizing a plurality of reactant liquids, in which the reactant liquids are supplied, immediately before being injected into a mold, to a container to be mixed in said container and then injected into said mold, said reaction injection machine comprising:

a plurality of supply vessels, each of said supply vessels having an interior for containing one of the reactant liquids;

an injection tank having an interior which acts as said container; and a fixed quantity metering device;

said fixed quantity metering device including a plurality of metering tanks, at least one of said metering tanks being provided for each of said supply vessels, each of said metering tanks having an interior for containing one of the reactant liquids to be metered, a plurality of metering pipes for connecting said supply vessels with said metering tanks, and a plurality of supply pipes for supplying to said injection tank the reactant liquids metered in said metering tanks;

wherein each of said supply vessels and said metering tanks has an air supply port connected to a pressure control means for setting said interior of each of said supply vessels and of said metering tanks to sub-atmospheric pressure, atmospheric pressure and supra-atmospheric pressure and a vacuum pump for setting said interiors of said supply vessels and said metering tanks to a vacuum, and wherein the reactant liquids are metered in said metering tanks to be supplied to said injection tank through said supply pipes and then, are stirred for mixing in said injection tank to be injected into said mold immediately after having been mixed.

5. A reaction injection machine utilizing a plurality of reactant liquids, in which the reactant liquids are supplied, immediately before being injected into a mold, to a container to be mixed and then, are injected into said mold, said reaction injection machine comprising:

a plurality of supply vessels for containing the reactant liquids, respectively;

a reservoir for containing a washing liquid;

an injection tank which acts as said container;

a washing tank;

a fixed quantity metering device;

said fixed quantity metering device including a plurality of metering tanks provided for said supply vessels and said reservoir, a plurality of metering pipes for connecting said supply vessels and said reservoir with said metering tanks, and a plurality of supply pipes for supplying to said injection tank and said washing tank the reactant liquids metered in corresponding metering tanks and the washing liquid metered in the remaining metering tank, respectively;

said supply pipes having outlet ports disposed adjacent to each other;

a stirrer provided adjacent to said outlet ports;

a pressure cover provided at a location distant from said outlet ports;

a pressure pipe communicating with a source of pressurized gas and an injection pipe communicating with a mold; said pressure pipe and said injection pipe being mounted on said pressure cover so as to extend through said pressure cover;

a carriage provided with an upper plate and means for reciprocatingly moving said carriage below said outlet ports of said supply pipes and said pressure cover so as to be reciprocated horizontally;

means associated with said upper plate for displacing said upper plate in the vertical direction, an injection tank and a washing tank, said injection tank and said washing tank being mounted on said upper plate in spaced relationship aligned in the direction of horizontal reciprocation of said carriage, said injection tank having an interior in which a first container is disposed for receiving the reactant liquids, said washing tank having an interior in which a second container is disposed for receiving the washing liquid; and a waste liquid tank;

said injection tank and said washing tank being adapted to be displaced, through travel of said carriage and the raising and lowering of said upper plate, to a first position at which the reactant liquids are supplied, through said fixed quantity metering device, to said injection tank from said supply vessels and are mixed by said stirrer, to a second position at which not only said interior of said injection tank is pressurized by hermetically sealing said injection tank with said pressure cover so as to perform an injection process of injecting into said mold the mixed reactant liquids in said injection tank but also the washing liquid is supplied, through said fixed quantity metering device, into said washing tank from said reservoir; and to a third position at which said interior of said washing tank is pressurized by hermetically sealing said washing tank with said pressure cover so as to deliver the washing liquid in said washing tank to said waste liquid tank through said injection pipe whereby said injection pipe is washed.

6. The reaction injection machine as claimed in claim 4, wherein said fixed quantity metering device further including:
   a metering valve which is provided between each of said metering tanks and each of said supply vessels on each of said metering pipes;
   a liquid level sensor for transmitting, upon detection that each of the reactant liquids supplied from said supply pipes has reached a predetermined level in each of said metering tanks, a closing signal to said metering valve, which is provided in each of said metering tanks; and
   a supply valve provided on each of said supply pipes such that the reactant liquids are respectively fed into said injection tank through said supply valve.

7. The reaction injection machine as claimed in claim 5, wherein each of said supply vessels, said reservoir and said metering tanks has an air supply port connected to a pressure control means for setting an interior pressure of each of said supply vessels, said reservoir and said metering tanks to sub-atmospheric pressure, atmospheric pressure and supra-atmospheric pressure and a vacuum pump for setting said interiors of said supply vessels, said reservoir and said metering tanks at a vacuum, said fixed quantity metering device further including:
   a metering valve which is provided, between said metering tanks and each of said supr´y vessels and said reservoir, on each of said metering pipes;
   a liquid level sensor for transmitting, upon detection that each of the reactant liquids and the washing liquid supplied from said supply pipes has reached a predetermined level in each of said metering tanks, and a closing signal to said metering valve, which is provided in each of said metering tanks; and
   a supply valve provided on each of said supply pipes such that the reactant liquids and the washing liquid are, respectively, fed into said injection tank and said washing tank through said supply valve.

8. The reaction injection machine as claimed in claim 5, wherein said stirrer is an impeller stirrer having an impeller, and further comprising:
   an impeller washing tank for washing said impeller of said impeller stirrer, said impeller stirrer being mounted on said upper plate co-aligned in the direction of horizontal reciprocation of said carriage relative to said injection tank and said washing tank;
   wherein when said injection pipe is being washed at the third position by hermetically sealing said washing tank with said pressure cover, said impeller is inserted into said impeller washing tank where it is washed.

9. The reaction injection machine as claimed in claim 7, wherein said stirrer is an impeller stirrer having an impeller, and further comprising:
   an impeller washing tank for washing said impeller of said impeller stirrer, said impeller stirrer being mounted on said upper plate co-aligned in the direction of horizontal reciprocation of said carriage relative to said injection tank and said washing tank;
   wherein when said injection pipe is being washing at the third position by hermetically sealing said washing tank with said pressure cover, said impeller is inserted into said impeller washing tank to be washed.

10. The reaction objection machine as claimed in claim 5, further comprising:
    a pressure control means for controlling pressure supplied through said pressure pipe to said injection tank and said washing tank, which is provided, between said pressure cover and said source of pressurized gas, on said pressure pipe so as to apply, in said injection process, a secondary pressure to the mixed reactant liquids after injection of the mixed reactant liquids into said mold at a primary pressure; said secondary pressure being equal to or higher than said primary pressure.

11. The reaction injection machine as claimed in claim 7, further comprising:
    a pressure control means for controlling pressure supplied through said pressure pipe to said injection tank and said washing tank, said pressure control means being provided between said pressure cover and said source of pressurized gas, on said pressure pipe for applying, in said injection process, a secondary pressure to the mixed reactant liquids after injection of the mixed reactant liquids into said mold at a primary pressure;
    said secondary pressure being equal to or higher than said primary pressure.

12. The reaction injection machine as claimed in claim 8, further comprising:
    a pressure control means for controlling pressure supplied through said pressure pipe to said injection tank and said washing tank, which is provided, between said pressure cover and said source of pressurized gas, on said pressure pipe so as to apply, in said injection process, a secondary pressure to the mixed reactant liquids after injection of the mixed reactant liquids into said mold at a primary pressure;
    said secondary pressure being equal to or higher than said primary pressure.

13. The reaction injection machine as claimed in claim 9, further comprising:
    a pressure control means for controlling pressure supplied, through said pressure pipe, to said injection tank and said washing tank, said pressure control means being provided, between said pressure cover and said source of pressurized gas, on said pressure pipe so as to apply, in said injection process, a secondary pressure to the mixed reactant liquids after injection of the mixed reactant liquids into said mold at a primary pressure;

said secondary pressure being equal to or higher than said primary pressure.

* * * * *